United States Patent
Nagarajan et al.

(10) Patent No.: US 11,902,309 B1
(45) Date of Patent: Feb. 13, 2024

(54) ANOMALY PREDICTION FOR ELECTRONIC RESOURCES

(71) Applicant: Amazon Technologies, Inc., Reno, NV (US)

(72) Inventors: Vijayan Nagarajan, Plano, TX (US); Lisa Harrington Waygood, Bainbridge Island, WA (US); Siddharth Krishnamurthy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 307 days.

(21) Appl. No.: 17/359,279

(22) Filed: Jun. 25, 2021

(51) Int. Cl.
*H04L 29/06* (2006.01)
*H04L 9/40* (2022.01)
*H04L 43/0805* (2022.01)
*G06N 7/01* (2023.01)

(52) U.S. Cl.
CPC ........... *H04L 63/1425* (2013.01); *G06N 7/01* (2023.01); *H04L 43/0805* (2013.01)

(58) Field of Classification Search
CPC .... H04L 63/1425; H04L 43/0805; G06N 7/01
See application file for complete search history.

(56) References Cited

U.S. PATENT DOCUMENTS

| | | | |
|---|---|---|---|
| 2012/0096552 A1* | 4/2012 | Paek | G06F 21/552 726/23 |
| 2015/0128263 A1* | 5/2015 | Raugas | G06F 21/552 726/23 |
| 2016/0226901 A1* | 8/2016 | Baikalov | H04L 63/1425 |
| 2016/0285700 A1* | 9/2016 | Gopalakrishnan | G06N 20/00 |
| 2018/0219889 A1* | 8/2018 | Oliner | G06N 3/04 |
| 2019/0102361 A1* | 4/2019 | Muralidharan | G06F 11/302 |
| 2020/0314127 A1* | 10/2020 | Wilson | H04L 43/16 |
| 2023/0229550 A1* | 7/2023 | Zhao | H04L 63/1425 714/33 |

* cited by examiner

*Primary Examiner* — Ka Shan Choy
(74) *Attorney, Agent, or Firm* — Hogan Lovells US LLP

(57) ABSTRACT

Historical time-series data can be analyzed using a probabilistic model to determine one or more distributions, including at least a normal distribution and an anomaly distribution. These distributions can be analyzed to obtain values for distribution parameters, such as mean, standard deviation, and density, as well as other statistical parameters, for use in building a forecasting model. This model can analyze the time-series data to predict or forecast actionable anomalies at one or more future points or periods in time, such as may exceed a determined anomaly threshold with at least a minimum amount of confidence. A determination can be made as to one or more actions to take in anticipation of the anomalous event, or volume of events, such as to attempt to prevent the occurrence or to be better positioned to handle the occurrence. Such forecasting or prediction can utilize both modeling and feature engineering.

20 Claims, 7 Drawing Sheets

Predicted Anomaly

Anomaly Type: Excessive Customer Call Volume

Predicted Period: 03/14/2024-03/17/2024

Cause: Accounts Compromised ← 302

Certainty: 94.57%

Volume Increase: 426.24%

Region(s) Impacted: EU, NA

[ Detail ]  [ Options ]  [ Clear ]

ANOMALY PREDICTION FOR ELECTRONIC RESOURCES

BACKGROUND

Computerized systems, such as may involve networks or data centers, can be susceptible to various anomalous events, or "anomalies." These anomalies can be triggered by the systems themselves, or may be the generated by external sources. In order to be able to anticipate these anomalies and plan accordingly, such as to increase staffing or resource levels or make adjustments to attempt to avoid or minimize the impact of these anomalies, it can be desirable to be able to accurately predict aspects such as the types, volume, scope, and timing of future anomalies. While historical data can be analyzed that includes information about past observed events, anomalous or otherwise, it is difficult to predict, with sufficient accuracy, future anomalies from time-series data or other such historical information.

BRIEF DESCRIPTION OF THE DRAWINGS

Various embodiments in accordance with the present disclosure will be described with reference to the drawings, in which:

FIG. 3 illustrates an example interface that can be generated in response to predicting an anomaly in accordance with various embodiments.

DETAILED DESCRIPTION

Approaches in accordance with various embodiments can be used to predict anomalous events or occurrences in electronic environments, such as computer networks. In at least one embodiment, time-series data can be obtained that includes historical information for previously-observed events of one or more types. This information can be analyzed using a probabilistic model, such as a Gaussian mixture model, to determine one or more distributions for the time-series data, including at least one normal distribution (or other distribution of time series data) and an anomaly, or anomalous, distribution. These distributions can be analyzed to obtain values for various distribution parameters, such as mean, standard deviation, and density, as well as potentially other statistical parameters, for use in building a classifier, such as a binary classification model. This classifier can analyze the data to predict actionable anomalies at one or more future points or periods in time, such as may exceed a determined anomaly threshold with at least a minimum amount of confidence. A determination can be made as to one or more actions to take in anticipation of the anomalous event, or volume of such events, such as to attempt to prevent the occurrence or to be better positioned to handle the occurrence. Such forecasting or prediction can utilize both modeling and feature engineering in at least some embodiments.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
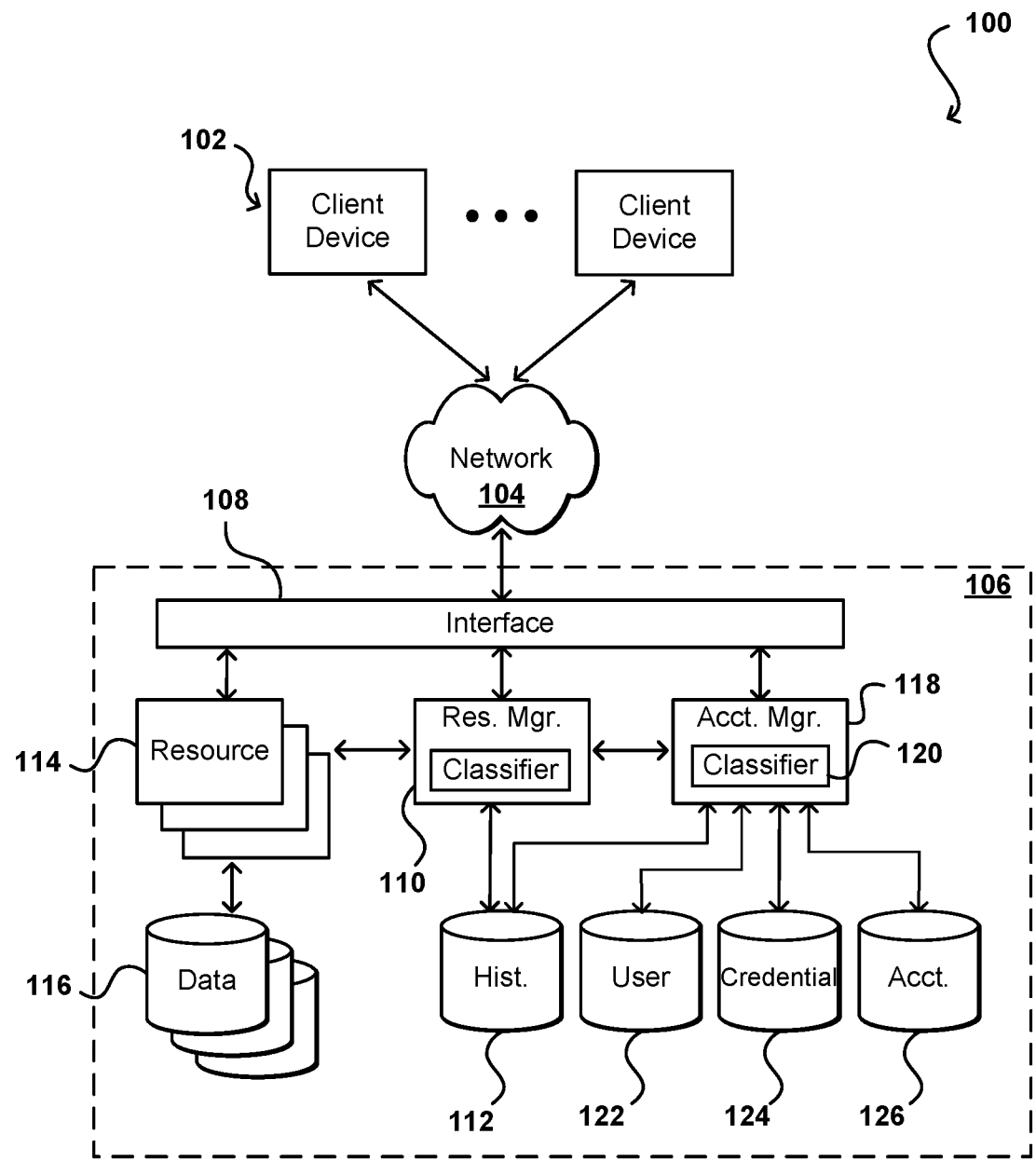
FIG. 1 illustrates an example computing environment that can be utilized in accordance with various embodiments.

FIG. 1 illustrates an example network architecture 100 in which aspects of various embodiments can be implemented. It should be understood that this is merely an example networking environment, and there can be various other configurations, components, and arrangements used for other networks in accordance with the various embodiments. This example shows a design that can be used for an environment such as a data center, wherein a source, such as any of a number of client devices 102, remote servers, or applications, is able to send requests across at least one network 104, such as the Internet or a cellular network, to be received by one or more components of the network 100. Such a configuration can be used in some embodiments to provide resource capacity for one or more users or customers as part of a shared-resource environment, where a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize at least a portion of one or more resources 114 (where that portion may be unknown or undeterminable to the user) can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, such as may involve communication with an account manager 118 with access to account, user, and credential data as may be stored in at least one data store 122, 124, 126 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

As mentioned, there may be various anomalies that may occur at various locations within, or associated with, a provider environment 106 or similar network or deployment. These can include, for example, anomalous events detected with respect to operation of the various shared resources 114, 116, anomalies in operation of the provider environment 106, or anomalies associated with customer accounts, among other such possibilities. In many embodiments, information about observed anomalies can be stored as historical data to at least one historical data repository 112. This historical information can include any relevant information about an observed event, anomalous or otherwise, such as a scope, location, time, number of occurrences, or type of event or anomaly, as well as any information about remediations or actions taken to address an anomaly. This historical information can be made available to various components, such as a resource manager 110 or account manager 118, in order to attempt to manage anomalies, such as to diagnose potential anomalies or determine remediation actions for identified anomalies.

As mentioned, it can also be desirable or beneficial in at least some embodiments to be able to predict the occurrence of future anomalies. Such predictions, or forecasting, can be beneficial for a number of reasons, such as to be able to attempt to prevent or reduce the occurrence of anomalies, or at least be able to put in place resources or capability for handling the anomalies, depending at least in part upon factors such as the types or volumes of anomalies predicted. In at least one embodiment, anomaly predictions can be made using one or more classifiers 120, as may be part of a standalone anomaly prediction service or incorporated into components such as a resource manager 110 or account manager 118, among other such options. These classifiers can analyze historical data, or receive processed historical data, and can analyze that data to determine or classify any potential anomalies that may be inferred from the data. In at least one embodiment, this may include determining one or more distributions from time-series historical data. It should be understood that the use of anomaly in this application can refer to an occurrence, frequency, volume, rate, or number of occurrences that exceeds a threshold or falls outside a typical or expected range, and that the occurrences themselves may not be considered as anomalies but normal events or occurrences, where the volume or other aspect of those events or occurrences can be said to be anomalous, or otherwise fall outside an expected value or exceed an specified threshold.

In one example use case, the resource provider environment may provide a user with access to at least a portion of the shared resources 114 under the terms of a user or customer account. Information for this account may be managed by an account manager 118 and stored to an account repository 126, where associated information for the user may be stored to a separate user repository 122 and credential information, used to authenticate the user attempting to access resources under the account, stored to a credential database 124 that may have restricted access, such as where only specific users have access to the keys for a given user. In some instances, a user accessing resources or services under the terms of their account may have problems, questions, or issues. These users may then reach out to customer service for the provider. This reach out can come in any of multiple forms through various channels, such as may include a call, email message, chat request, text message, or instant message sent over at least one network. There may be a dedicated account access management team in customer service (CS) that handles specific types of these support cases, such as security-related cases as may relate to multi-factor authentication (MFA) or compromised accounts. For example, an MFA mechanism might be used with a one-time password or new devices to verify an identity of the person logging into the account, and there may be issues with the MFA-based authentication process that prevent a valid user from being authenticated, a user may forget or misplace credentials required for authentication, or there may be situations where an unauthorized user attempts to access the account, which generates a notification for the authorized user, among other such options. Other examples may relate to escalated account ownership transfer disputes, escalated dynamic challenge question handling, or changes to email addresses (or other contact information). For each of these and other such cases, these reach outs may be directed to that dedicated account access management team.

One of the challenges that might face such a team is to be able to anticipate the occurrence of these cases so that the team may be staffed and deployed appropriately. It may not be cost effective to keep a large enough staff to handle these anomalies at all times, when the anomalies might only occur a small fraction of the time. On the other hand, an inability to have adequate staffing when these anomalies occur can result in at least a poor experience for many users. At least some types of anomalies may be predictable, at least in part because higher volumes of calls may be experienced at certain times of year, seasonally, or around certain events. Small changes in volumes may be handled through routine staffing management, but for anomalies of at least a certain size or variation it may be necessary to take additional action, such as where thousands of extra calls are received in a given day relative to normal call volume. For these types of events, it is not sufficient to be reactive because obtaining the staffing takes time and may not be available when needed. Further, there may not be sufficient budget allocated to cover these additional resources for unanticipated needs.

In at least one embodiment, historical volume data can be utilized to attempt to predict the occurrence of future anomalies, as well as information for those anomalies. In at least one embodiment, this historical volume data can be plotted along a time axis, as illustrated in the plot 200 of FIG. 2A, to obtain a set of time-series data. It should be understood that this time-series data can also be determined without such plotting but through appropriate analysis or sorting, among other such options. One or more distributions for this time-series data can be utilized to attempt to determine the presence of anomalies at a future point in time. In at least one embodiment, this may include determining both an event distribution (e.g., a normal or binomial distribution determined from historical event data) and an anomaly distribution for the time-series data as illustrated in the example plot of FIG. 2B. As an example, MFA removal data over time can be plotted and a normal distribution generated, which might provide information indicating that, on average, the dedicated account access management team receives around 250 cases per week relating to MFA removal, or around 1000 cases per month. In this plot, there are three different normal distributions 252, 254, 256 illustrated. The anomaly distribution 250 is illustrated that can be ascertained form these various distributions, as may include the three normal distributions. There may be one or more normal distributions in given set of historical data. The three component distributions in this data correspond primarily to the period of low case volume before Q4 202 in FIG. 2A, resulting in a very small distribution 256, a the more consistent variation in call volume during and after Q4 2020, which is represented by a second distribution, and the occasional spikes in event volume which are represented by a third distribution. The combination of these three distributions makes up the anomaly distribution 250 in this example. The distributions that make up the anomaly distribution can also include other types of distributions as well, such as a binomial or Gaussian distribution. The presence of multiple distributions in the anomaly distribution helps to identify significant anomalous behavior, or behavior that differs from typical behavior or event occurrence. The distributions can then be utilized to determine an anomaly threshold 282, as illustrated in the example plot 280 of FIG. 2C. As illustrated, the threshold can be determined based on the parameter values from the distributions, and can be used to determine the threshold 282 that separates normal or expected activity from anomalous activity. This threshold can then be used with the respective confidence values in the classifier model.

It can also be beneficial to analyze fraudulent activity, such as compromised events, that are more than an occasional occurrence. For example, there might be certain weeks where the dedicated account access management team might receive tens of thousands of cases. An approach that can be utilized in accordance with various embodiments can analyze the data distribution using one or more Gaussian mixture models. A Gaussian mixture model (GMM) is a probabilistic model that assumes volume data points are generated from a mixture of a finite number of Gaussian distributions with unknown parameters. A Gaussian mixture model can be used to attempt to identify both the normal distribution and the anomaly distribution, where these distributions are determined from the actual time-series data. Once these distributions are generated, the parameters of each distribution can be calculated, and may include parameters such as mean, standard deviation, and density, to capture the behavior of the distribution. The values for these three parameters can then be used to determine a threshold for use with a classifier, such as a binary classifier model. This binary classification model can then be used to predict the occurrence of anomalies at one or more future points in time. Along with the prediction, the classifier can produce a probability of a given anomaly event occurring in the future, such as on a particular date or at a point or period in time. This can enable a determination of whether this anomaly prediction is actionable, such as where the anomaly is predicted to occur with at least a minimum threshold probability. There may be different thresholds used for different types of anomalies in some embodiments, as a provider might have higher thresholds for costly events that do not have significant impact on performance or experience, but may have lower confidence or probability thresholds for events that may significantly impact performance or are not costly to implement. There may be other output from a Gaussian mixture model that may be included in these determinations as well, as may relate to a total number of customers or accounts, as well as the types of security utilized for those customers or accounts, for an account access type of event.

In at least one embodiment, a probability can be obtained with a number of density-related features. A time-series forecasting model can then be built that predicts future events based, at least in part, upon past events that were observed. This model can be built using the Gaussian prediction model parameters, and a quantity of a given event can be predicted for any future time or date. A number of statistical parameters can also be utilized as discussed in more detail later herein. A model can thus predict future anomaly volume in addition to the probability of this future anomaly volume occurring. As mentioned, such a forecasting approach can also utilize a pair of forecasting pipelines that utilize the normal distribution and the anomaly distribution, respectively.

Figure 2A:
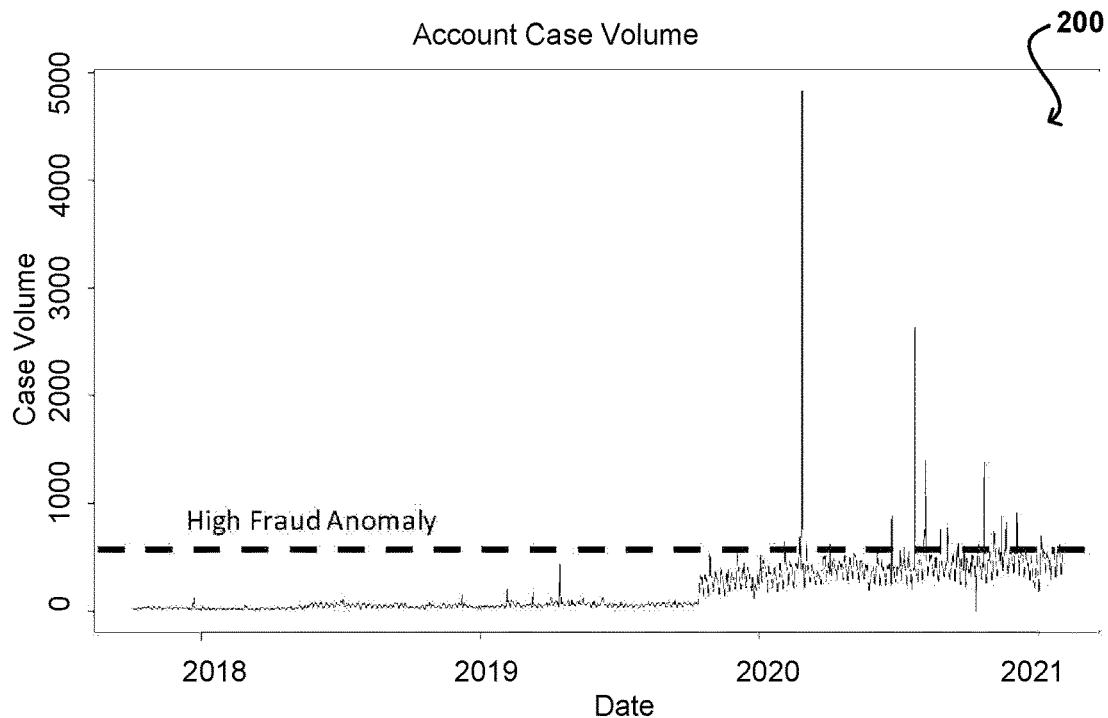
FIGS. 2A, 2B, and 2C illustrate anomaly, distribution, and threshold data, respectively, that can be analyzed or determined in accordance with various embodiments.
Figure 2B:
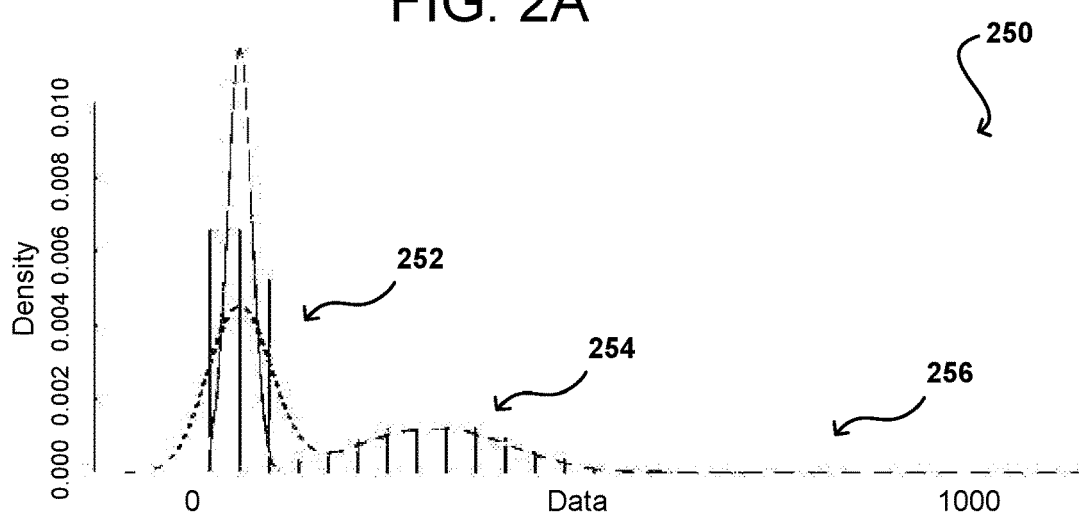
Figure 2C:
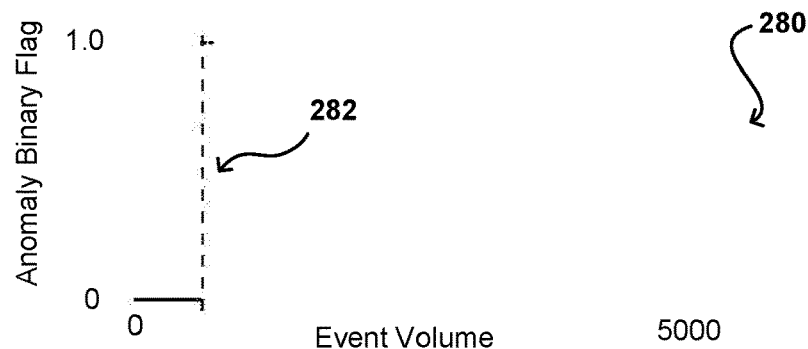

The time-series data plotted in FIG. 2A illustrates a number of spikes in case volume for specific points in time. As illustrated, these large spike occur only occasionally. A number of smaller spikes may occur with higher regularity and/or frequency. This data can be analyzed using a model, such as a Gaussian mixture model, to generate the distributions of FIG. 2B. In analyzing the distributions, most of the cases fall within the 0 to 100 event range (the normal distribution 252). As illustrated, however, there is a second distribution (the anomaly distribution 254) between around 200 and 600 cases that corresponds to the occasional spikes illustrated in FIG. 2A. The distributions can be used to obtain parameters such as mean, standard deviation, and density as discussed. Multiple distributions can be generated from this data, as illustrated by the distributions in FIG. 2B. These distributions can be dynamic, and there may be different numbers of distributions for different event types or points in time. The model can also be tuned to provide parameters for specific distributions. As mentioned, these parameters can then be used to build a classifier or forecasting model, which in at least some embodiments can be a binary classifier model. In some embodiments, different anomalies in the data may be analyzed, such as three different anomalies. The classification model can then be built using the probabilities for these different events. In some embodiments, a multinomial classification model can be used as well to provide more granular prediction information.

In at least one embodiment, an interface 300 or notification can be generated as illustrated in FIG. 3 for any predicted anomaly occurrence that exceeds the anomaly threshold, or is otherwise classified as an actionable anomaly by a classifier model. This interface can present any relevant information 302, as may relate to a type of anomaly, period of predicted occurrence, anticipated volume increase, certainty, location, and other such information. In at least some embodiments, the presented information may be configurable or may vary with type of anomaly. The interface can also present various options, such as to clear the notification if the anomaly is determined not to be actionable or if an action is taken, to obtain additional information, or to view options that can be taken in anticipation of the predicted anomaly. In at least one embodiment, one or more proactive actions can be taken to be able to handle the anomaly, such as to initiate hiring or reassignment of personnel or resources to handle the anomaly. Another option is to attempt to determine or diagnose a cause of this predicted event and make changes (manually or automatically) to attempt to avoid the event, or at least minimize an impact of the event.

Figure 4:
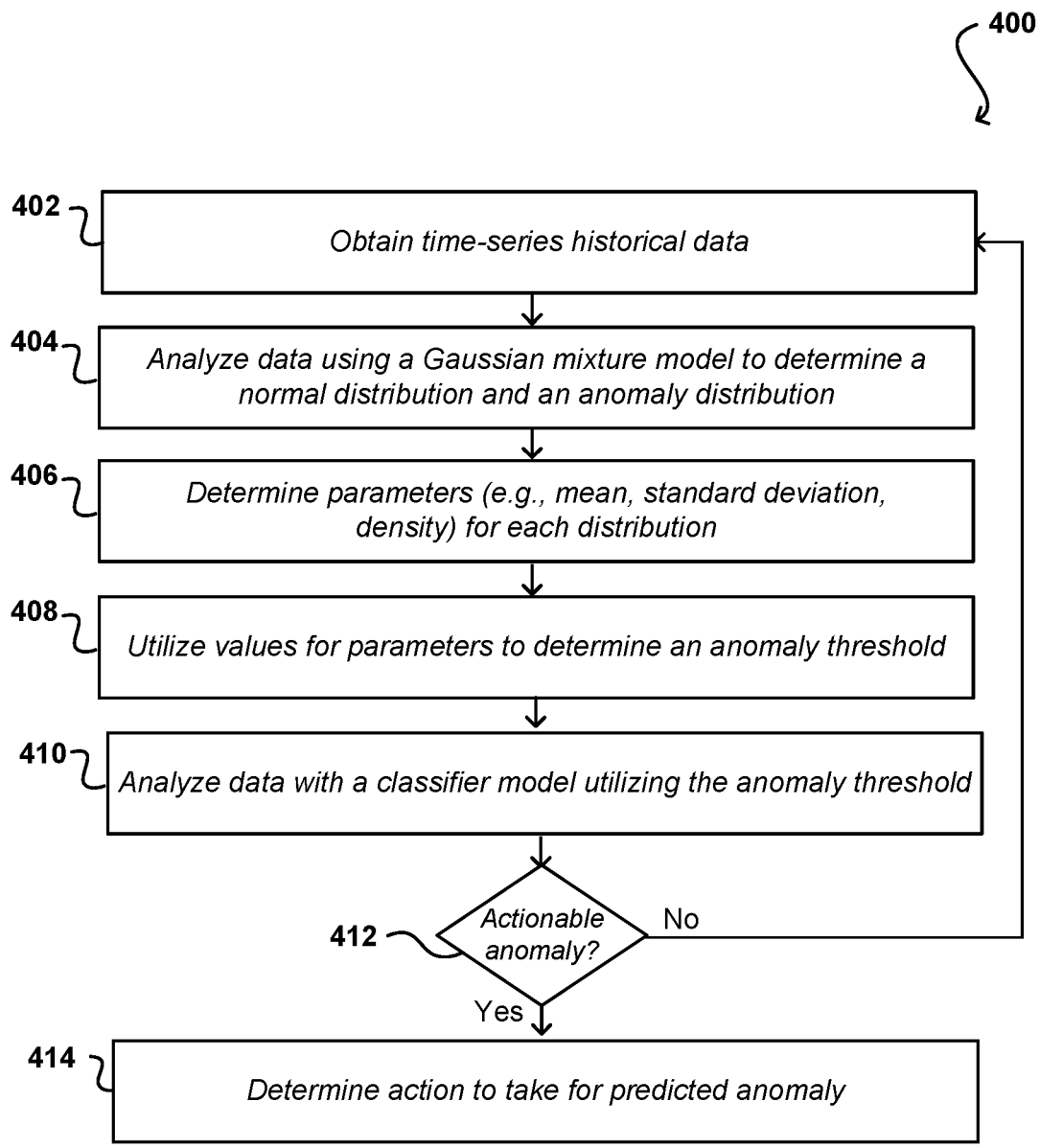
FIG. 4 illustrates an example process for predicting one or more anomalies that can be utilized or performed in accordance with various embodiments.

FIG. 4 illustrates an example process 400 for predicting the occurrence of anomalies that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, time-series historical data is obtained 402, as may include information for previously-observed events or anomalies at various points in time. This data can be analyzed 404 using, for example, a Gaussian mixture model to determine distributions for the data, including at least a normal distribution and an anomaly, or anomalous, distribution. A set of parameters, as may include mean, standard deviation, and density, can be determined 406 for each of these distributions, or at least a subset of these distributions. The values for these parameters can then be utilized 408 to determine an anomaly threshold. The anomaly threshold can be fixed or dynamic, and may be optimized using machine learning or another such approach in accordance with various embodiments. The time-series data can then be analyzed 410 with a classifier (e.g., a binary classifier) model utilizing this anomaly threshold to attempt to identify one or more anomalies predicted to occur with a volume that meets or exceeds the anomaly threshold. If it is determined 412 that one or more actionable anomalies are predicted, such as anomalies that exceed the anomaly threshold and have at least a minimum confidence in that prediction, then at least one action can be determined 414 to be taken in anticipation of that anomaly. If no actionable anomaly is identified, then the process can continue for another period in time of type of anomaly.

It should be understood that such an approach can be beneficial for many different use cases or types of data, particularly where there are anomalies in the time series data that can be quantified. This may include, for example, fraudulent or abnormal behavior with an application, service, or website. For example, there may be days where there may be over one million extra requests to a webpage, which may represent legitimate or fraudulent activity, but may benefit from being anticipated either way. Similar anomalies can exist outside computing contexts as well, but where information about those anomalies is captured and available for analysis as discussed herein.

At least one embodiment can make use of an automated framework for time-series feature engineering and forecasting, referred to herein as an ATFF framework, that combines technical analysis functions and automated statistical and machine learning models. Time series modeling and forecasting has fundamental importance to various practical domains. For instance, large organizations engage in capacity planning to efficiently allocate scarce resources and goal setting in order to measure performance relative to a baseline. Producing high quality forecasts is not an easy problem for either machines or for most analysts. Many models have been proposed for improving the accuracy and efficiency of time series modeling and forecasting. Capturing the dynamical properties of time series concisely as interpretable feature vectors can enable efficient and accurate forecasts. Traditional models, such as auto-regression fitted with least squares (Classic-AR) can model time-series with a concise and interpretable model. However, accuracy of forecast greatly depends on data and information that can be extracted from the data. There are many methods available for non-time series feature engineering and modeling, but creating features in time series is challenging as it can require knowledge of the future value of a feature in order to forecast the target, resulting in an infinite time series model. Thus, conventional approaches are limited to use of traditional time series models for forecasting, which use features such as AR and MA. A framework such as ATFF can be utilized to overcome these and other such challenges. An ATFF framework can automatically create thousands of features that capture aspects such as time series trends, seasonalities, and anomaly behavior, and such a framework can also model these features into traditional time series and machine learning models.

Temporal data has an intrinsic time component that is present in most real-world applications (e.g., capacity planning or the stock-market). A time series is a sequence of time-ordered data values that measures some process. Time-dependent data-center traffic is an example of a time-series. Forecasting is an important data science task that is central to many activities within an organization. Forecasting can be performed for several years in advance, for purposes such as organizational planning, or a few seconds ahead for tasks such as operational automation. To generate an accurate forecast, it can be valuable to understand whether there are any factors that influence the process, and whether the process can influence itself. Conventional approaches are not sufficiently mature when it comes to the question of feature engineering, hyper-parameter tuning, and auto-ML as it applies to time series forecasting. In the real world, analysts who can produce high quality forecasts are quite rare because forecasting is a specialized data science skill requiring substantial experience.

A time series can be modeled through a stochastic process $Y(t)$ that is a sequence of random variables. In a forecast setting, it can be desirable to estimate $Y(t+h)$ at time $t$, using only information available at time $t$, as may be given by:

$$\hat{Y}(t+h|t) = Y(t)$$

Automatic forecasts of large numbers of time series are often needed in business. The most popular automatic forecasting algorithms are based on exponential smoothing, ARIMA models, and additive models. Although packages such as forecast and prophet can help to model time series data by capturing trends and seasonalities, conventional approaches do not perform automatic time series feature engineering. These models primarily provide only trends and seasonalities, but generate an accurate forecast a model can also require access to features like anomalies, oscillators, momentum factors, and rates of change, among others.

Figure 5:
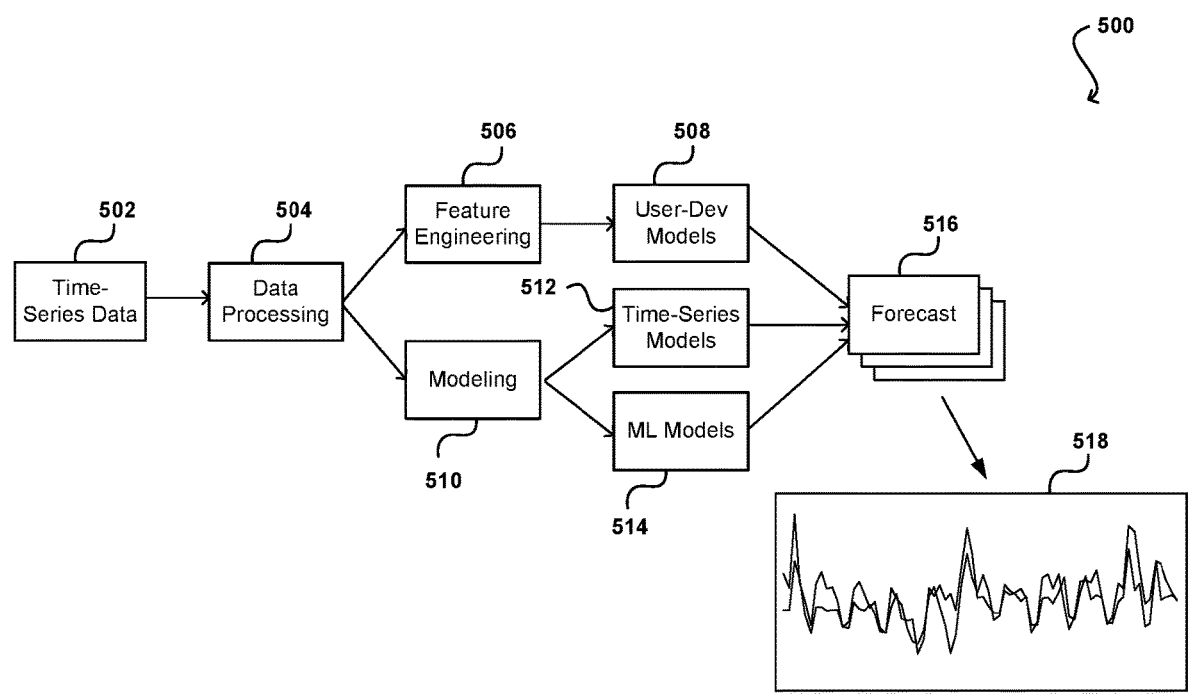
FIG. 5 illustrates an example data forecasting pipeline that can be utilized in accordance with various embodiments.

FIG. 5 illustrates an example ATFF pipeline 500 that can be utilized in accordance with various embodiments. Time series data 502 can be input to a data processing module 504, or application, which can perform any data processing or formatting utilized for an ATFF implementation. Time series data is a collection of quantities that are assembled over even intervals in time and ordered chronologically. The time interval at which data is collection is generally referred to as the time series frequency. The data processing module 504 can then pass this data, in parallel in this example, to two different components of this example pipeline 500. A feature engineering component 506 can analyze the data to attempt to capture aspects such as trends, seasonalities, and anomalies through technical analysis functions and statistical functions. A modeling component 510 can manage modeling of the data utilizing one or more traditional (or non-traditional) time series models 512, as well as one or more machine learning models that may have been trained using time series data frequency and groups. These various models can then be used to generate a set of forecasts 516. Multiple models can be used to generate multiple forecasts, at least for the reason that not all forecasting problems can be solved adequately by the same procedure, at least for many of those discussed and presented herein. An ATFF framework can be optimized for specific tasks, such as business forecast tasks encountered at one or more companies. Example tasks typically have any of the following characteristics: (1) daily, weekly, or monthly observations with at least a few months (preferably a year) of history; (2) time series with or without grouping columns; (3) strong seasonalities such as day of week and time of year; (3) historical trend changes, for instance organization changes, environment changes (e.g., covid, hurricanes, or weather changes); or (4) linear and non-linear trends.

An example ATFF framework can include functions that can create thousands of features based on, for example, the needs or various users. These features created can include both iterative features and batch features. Iterative features can be based on previous continuous lags, such as by creating a n-day simple moving average using 1 day lag time series of monthly data. Batch features may be based on previous gapped lags, such as by creating a n-day simple moving average using 30 day lag time series for a daily forecast of 30 days. An example ATFF framework can create thousands of time series and statistical features based on time series level. This can include date features such as month, quarter, week of month, day of week, week of month, holidays, or weekends, for example, to capture seasonalities and anomalies based on time. It can also include simple moving averages for n days, as may be given by:

$$SMA_t(n) = \frac{P_t + \ldots + P_{t-n+1}}{n}$$

It may also include an exponential moving average (EMA) that places a greater weight and significance on the most recent data points. An exponentially weighted moving average can react more significantly to recent time changes than a simple moving average (SMA), which applies an equal weight to all observations in the period. An ATFF framework can generate numerous moving averages to capture trend and seasonalities such as weighted moving average, double-exponential moving average, elastic volume-weighted moving average, zero lag exponential moving average, volume-weighed moving average, variable-length moving average, hull moving average, Arnaud Legoux moving average, such as may be given by:

$$ema_t(P, n) = \beta P_t + \beta(1-\beta)P_{t-1} + \beta(1-\beta)^2 P_{t-2} - \ldots = \beta P_t + (1-\beta)ema_{t-1}(P, n)$$

An example framework can also determine a moving average convergence/divergence (MACD), which represents the difference between a short-period (fast) EMA and a long-period (slow) SMA. For its usage, it can be compared against its exponential smoothed line. MACD sometimes appear as the percentage format, and may be given by:

$$macd_t(S,L) = ema_t(P,S) - ema_t(P,L),$$

$$sig_t(S,L,K) = ema_t(macd(S,L),K),$$

$$macd(S,L) = ema_t(P,S) - ema_t(P,L))/ema_t(P,L).$$

An example framework can also determine a relative strength index (RSI) that normalizes the ratio of the (simple or exponential) average numbers to the average of time-series to the scale from 0 to 100, as well as momentum factors and rate of change (ROC) with K momentum at t equals to return of K time, as may be given by:

$$roc(K) = \frac{P_t - P_{t-K}}{P_{t-K}}$$

These and other such features can be created based on time series granularity. An example ATFF framework can handle any kind of time series such as daily, weekly, monthly and yearly data. An example framework can also handle any number of time series, such that it can work for both single time series and grouped time series data. In addition, such a framework can also create thousands of trends and seasonality features to run any machine learning model. Having options to run both statistical and machine learning models for time series data is a significant advantage for forecasters.

In at least one embodiment, a generalized time-series modeling function can be used that runs a number of time series models for given single time series data and outputs resulting data. For instance, the monthly GDP for the USA is a single time series that does not has any grouping variables. Various models can be trained to fit the model automatically by, for example, tuning the hyper-parameters using a random grid search and Bayesian optimization, where those models may include prophet, Fourier time series, ARIMA, and exponential smoothing models. A generalized grouped time-series modeling function that runs number of time series models for given grouped time series data and output the data. It does have a grouping variable, such as the unemployment rate for each state in the USA. Various models can be trained to fit the model automatically, such as by tuning the hyper-parameters using random grid search and Bayesian optimization, as may also include prophet, Fourier time series, ARIMA, and exponential smoothing models. A machine learning model can fit a number of tree-based models to both single and grouped time series data with the features created previously, and can output the performance of the fitted model on the validation set. Various models can be trained to fit the model automatically by tuning the hyper-parameters using random grid search and Bayesian optimization, as may include a generalized linear model, gradient boosting machine, XgBoost, or random forest model.

Such a framework can provide for time-series feature engineering and forecasting that combines technical analysis functions and automated statistical and machine learning models. Such a framework makes it possible to create numerous automated features for any kind of time series data resulting better time series and machine learning model forecasts. An example framework can be created as a language package that works on any operating system. Such a framework is also able to support various granular levels of time series data, as well as multiple neural network and temporal components. Such a framework can provide a practitioner with a simple but powerful time-series tool powered by automation.

Figure 6:
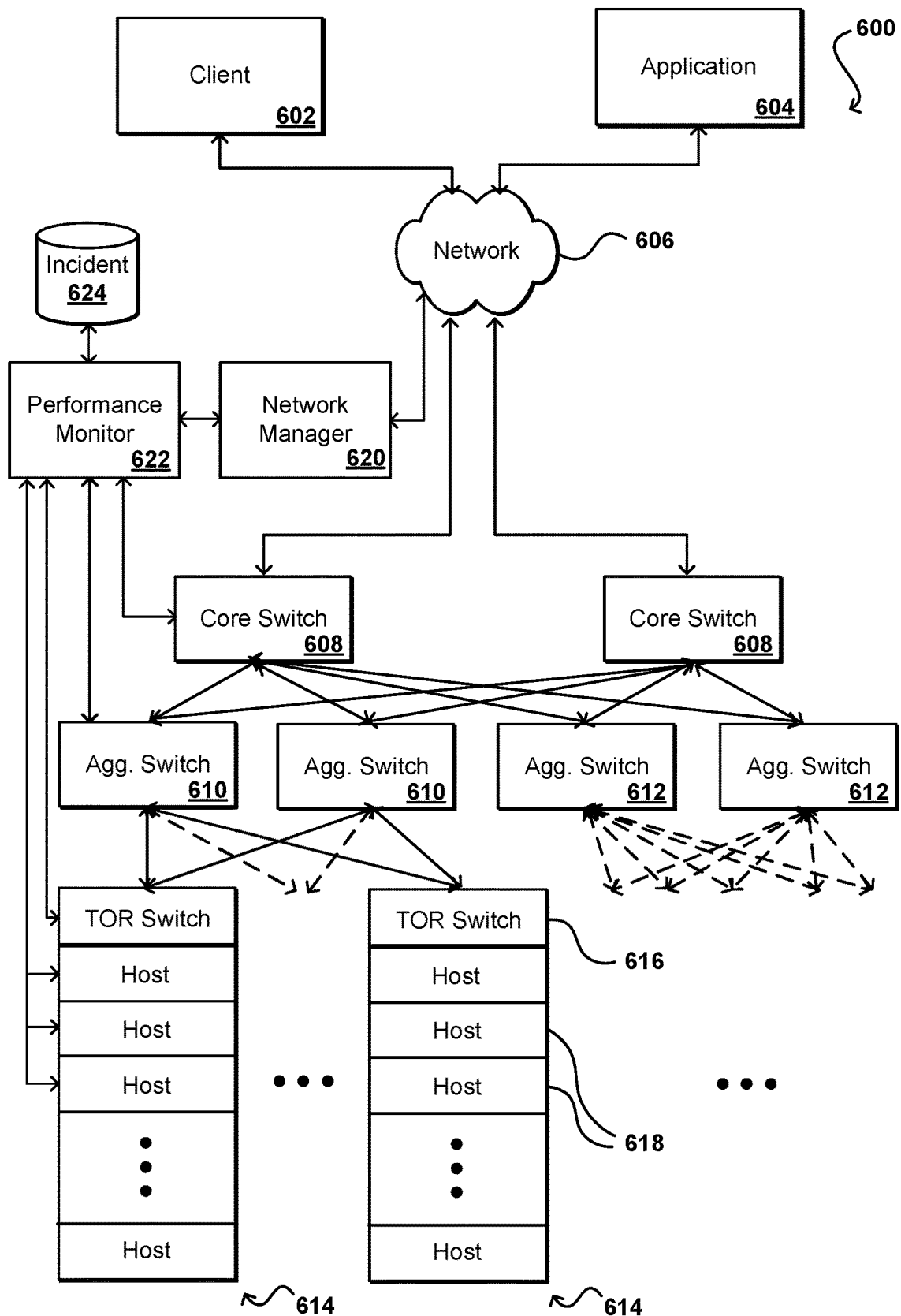
FIG. 6 illustrates components of an example network environment in which aspects of various embodiments can be implemented.
Figure 7:
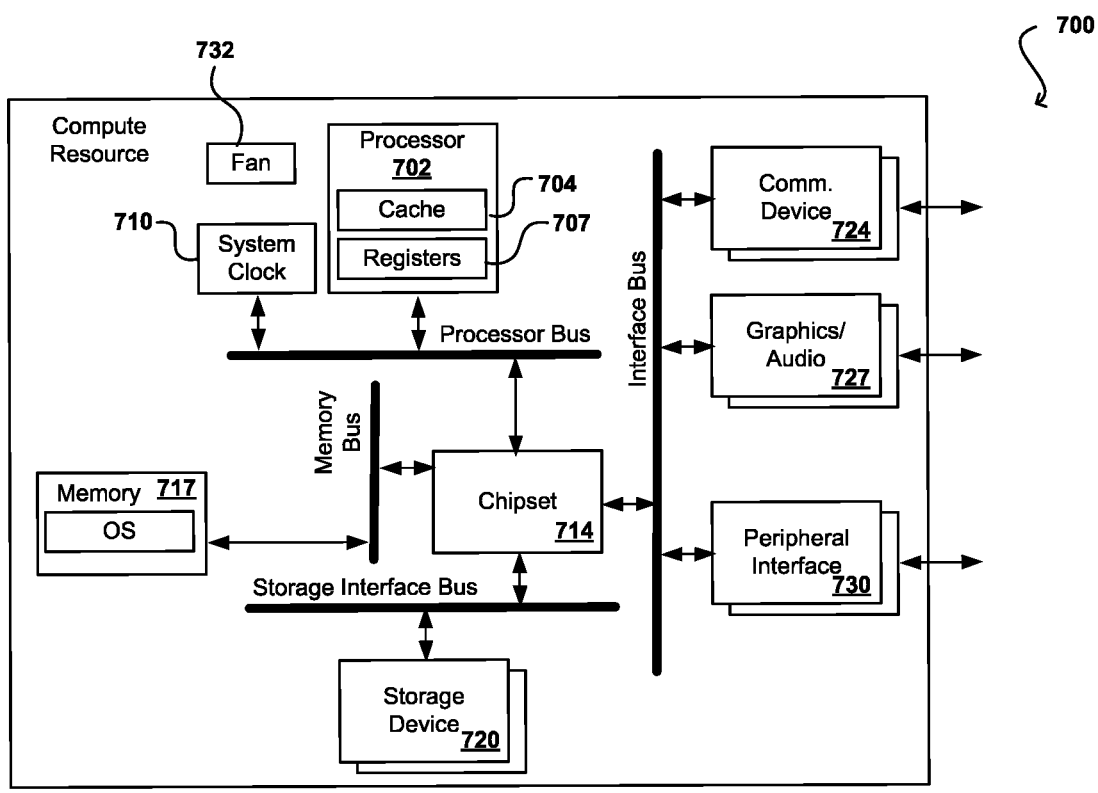
FIG. 7 illustrates components of an example computing resource that can be utilized in accordance with various embodiments.

FIG. 6 illustrates an example network architecture 600 in which aspects of various embodiments can be implemented. This example network configuration that can be used to route communications between specific host machines or other such devices in such an environment. It should be understood that this is merely an example networking environment, and there can be various other configurations, components, and arrangements used for other networks in accordance with the various embodiments. This example shows a typical design that can be used for an environment such as a data center, wherein a source, such as a client device 602 or application 604, is able to send requests across at least one network 604, such as the Internet or a cellular network, to be received by one or more components of the network 600. Properties of various components of the network, such as provisioned resource instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

In various networks, there may also be many such data centers in various locations or regions, which may also be connected by a network of devices. This can include, for example, use of a backbone network or other such network to connect the various data centers. There may also be local networks that connect devices and data centers within a region, as well as networks that connect one or more regions.

As should be apparent, such a network can be quite complicated, with a large number of connections between a large number of devices, of multiple types, in different regions or locations. An incident may occur in such a network, which may impact a number of connected devices in that network. An incident may refer to an occurrence in a network, that may be undesired or unexpected, which can be associated with a number of detected events and/or alarms in a relatively compact (or otherwise grouped) space or time in a network, such as a mesh network or the Internet. When an incident occurs in such a network, it can be difficult to determine the cause or extent of the incident, as well as to determine how to best remediate or address the incident. In at least one embodiment, various network devices, as well as devices connected to a network, can generate alarms or notifications upon detection of an event, where that event may be one of a number of event types that have been designated as worthy of generating such an alarm or notification. An event may be indicative of an underlying cause of an incident. The evolution of events detected for an incident may be viewed as a network incident signature in at least some embodiments. The devices can be configured or programmed to provide these alarms, or there can be sensors or components added to provide these alarms, among other such options. In some embodiment this may not include alarm data, but data for an event or occurrence in the network that may be relevant to an incident.

In at least one embodiment, this event data can be collected by (or otherwise received to) a system, service, component, application, or process such as a performance monitor 622. The performance monitor 622 can receive this information and store at least a relevant subset of this data to an incident or event repository 624. In other embodiments, this data may be received to an incident repository 624 and then accessed by a performance monitor 622. The performance monitor 622 can then provide information about an incident, whether through a display, report, notification, or other such mechanism. This can include event information that may be relevant to a determined or detected incident. The relevance may be determined based upon factors such as a proximity (in the network topology) to a determined incident, event data captured over a window of time, or event data captured within a determined region, among other such options or combinations thereof. This information can be provided to a network operator, for example, who can use this information to attempt to diagnose and remediate the network incident. Steps taken to remediate the incident can also be entered or captured through the performance monitor 622 or network manager 620, for example, and can be stored with the event data in the incident repository.

As known for computing devices, the computer will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 730 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 730, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a processor bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java©, C, C #or C++ or any scripting language, such as Perl, Python or TCL, as well as combinations thereof. The server(s) may also include database servers, including without limitation those commercially available from Oracle*, Microsoft*, and IBM© as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining historical volume data representative of a plurality of past events;
   generating, from the historical volume data, a set of time-series data;
   analyzing the time-series data using a Gaussian mixture model to determine a normal distribution and an anomaly distribution;
   determining, from the normal distribution and the anomaly distribution, values for a set of distribution parameters;
   generating, using the values for the set of distribution parameters, a time-series forecasting model that comprises a machine learning model trained using probabilities for different anomalous events;
   determining, using the time-series forecasting model, a quantity of future anomalies; and
   providing notification of the quantity, wherein at least one proactive action is enabled to be taken for an occurrence of the future anomalies.

2. The computer-implemented method of claim 1, further comprising:
   determining whether the quantity of future anomalies exceeds an anomaly threshold, with at least a minimum confidence, before taking the at least one proactive action.

3. The computer-implemented method of claim 1, wherein the quantity of future anomalies is further determined using a forecasting framework that provides for feature engineering, along with the time-series forecasting model, to be associated with event forecasting.

4. The computer-implemented method of claim 3, wherein the machine learning model is trained using Gaussian prediction model parameters and a quantity of an anomalous event predicted for at least one future time or date.

5. The computer-implemented method of claim 1, wherein the set of distribution parameters includes at least mean, standard deviation, and density.

6. A computer-implemented method, comprising:
   determining a normal distribution and an anomaly distribution from historical time-series data;
   determining, for the normal distribution and the anomaly distribution, values for a set of distribution parameters;
   building a time-series forecasting model based upon the values for the set of distribution parameters, the time-series forecasting model comprising a machine learning model trained using probabilities for different anomalous events; and
   generating, using the time-series forecasting model, a prediction of a future occurrence of one or more anomalies.

7. The computer-implemented method of claim 6, wherein the normal distribution and the anomaly distribution are determined using a Gaussian mixture model.

8. The computer-implemented method of claim 6, further comprising:
   determining at least one action to take based upon the prediction, the at least one action selected to manage, prevent, or lessen an impact of the future occurrence of the one or more anomalies.

9. The computer-implemented method of claim 6, wherein an additional distribution is determined from the historical time series data, and wherein the anomaly distribution is determined from the normal distribution and the additional distribution, the additional distribution including a Gaussian distribution or a binomial distribution.

10. The computer-implemented method of claim 6, further comprising:
    determining a probability threshold, wherein a volume of events of a given type that exceeds the probability threshold at a future point or period in time is classified as an anomaly.

11. The computer-implemented method of claim 6, further comprising:
    classifying, using the machine learning model, the one or more anomalies as actionable anomalies if the one or more anomalies are predicted with at least a minimum confidence or probability.

12. The computer-implemented method of claim 6, wherein the prediction of the future occurrence is further determined using a framework that provides for feature engineering along with the time-series forecasting model.

13. The computer-implemented method of claim 12, wherein the machine learning model is trained using Gaussian prediction model parameters and a quantity of an anomalous event predicted for at least one future time or date.

14. The computer-implemented method of claim 6, wherein the set of distribution parameters includes at least mean, standard deviation, and density.

15. The computer-implemented method of claim 6, further comprising:
    generating the historical time-series data from historical volume data.

16. A system, comprising:
    a processor; and
    memory including instructions that, when executed by the processor, cause the system to:
    determine an event distribution and an anomaly distribution from historical time-series data;
    determine, for the event distribution and the anomaly distribution, values for a set of distribution parameters;
    obtain a time-series forecasting model based upon the values for the set of distribution parameters, the time-series forecasting model comprising a machine learning model trained using probabilities for different anomalous events; and
    generate, using the time-series forecasting model, a prediction of a future occurrence of one or more anomalies.

17. The system of claim 16, wherein the event distribution and the anomaly distribution are determined using a Gaussian mixture model.

18. The system of claim 16, wherein the instructions when executed further cause the system to:
   determine at least one action to take based upon the prediction, the at least one action selected to manage, prevent, or lessen an impact of the future occurrence of the one or more anomalies.

19. The system of claim 16, wherein the instructions when executed further cause the system to:
   determine an anomaly threshold, wherein a volume of events of a given type that exceeds the anomaly threshold at a future point or period in time is classified as an anomaly.

20. The system of claim 16, wherein the prediction of the future occurrence is further determined using a framework that provides for feature engineering along with the time-series forecasting model, and wherein the machine learning model is trained using Gaussian prediction model parameters and a quantity of an anomalous event predicted for at least one future time or date.

\* \* \* \* \*